United States Patent
Sauter et al.

(10) Patent No.: US 6,722,005 B2
(45) Date of Patent: Apr. 20, 2004

(54) TURRET

(75) Inventors: Reiner Sauter, Metzingen (DE); Alfred E. Müller, Metzingen (DE); Detlef Sahm, Lichtenwald/Hegenl (DE); Jochen Dieringer, Hechingen (DE)

(73) Assignee: Sauter Feinmechanik GmbH, Metzingen (DE)

( * ) Notice: Subject to any disclaimer, the term of this patent is extended or adjusted under 35 U.S.C. 154(b) by 0 days.

(21) Appl. No.: 10/147,312

(22) Filed: May 17, 2002

(65) Prior Publication Data

US 2002/0170397 A1 Nov. 21, 2002

(30) Foreign Application Priority Data

May 18, 2001 (DE) .......................... 101 25 722

(51) Int. Cl.$^7$ .......................... B23P 23/02; B23B 29/32
(52) U.S. Cl. .......................... 29/40; 29/39; 29/48.5 A; 74/813 R; 74/813 L; 310/54
(58) Field of Search .................. 29/40, 39, 33 J, 29/48.5 R, 48.5 A; 74/813 R, 813 L; 82/159; 408/35; 310/52, 54

(56) References Cited

U.S. PATENT DOCUMENTS

| | | | | |
|---|---|---|---|---|
| 4,202,227 A | * | 5/1980 | Thumm | 82/159 |
| 4,244,247 A | * | 1/1981 | Zaninelli | 82/159 |
| 4,989,303 A | * | 2/1991 | Sauter et al. | 29/48.5 A |
| 5,168,614 A | * | 12/1992 | Thumm | 29/40 |
| 5,187,847 A | * | 2/1993 | Thumm et al. | 29/48.5 A |
| 5,664,470 A | * | 9/1997 | Garnett et al. | 82/121 |
| 5,918,510 A | * | 7/1999 | Uemura et al. | 74/813 L |
| 6,276,035 B1 | * | 8/2001 | Hessbruggen et al. | 29/40 |

FOREIGN PATENT DOCUMENTS

| | | |
|---|---|---|
| DE | 3701090 | 7/1988 |
| DE | 3817893 | 11/1989 |
| DE | 4018543 | 8/1991 |
| DE | 19719173 | 11/1997 |
| DE | 19919553 | 3/2001 |
| EP | 0302998 | 2/1989 |
| EP | 0514626 | 11/1992 |
| EP | 0623988 A2 * | 11/1994 |
| JP | 5-38607 A * | 2/1993 |
| WO | WO-88/02947 A1 * | 4/1988 |

* cited by examiner

*Primary Examiner*—Erica Cadugan
(74) *Attorney, Agent, or Firm*—Roylance, Abrams, Berdo & Goodman, L.L.P.

(57) ABSTRACT

A turret includes a housing connected to a machine tool, a rotatably mounted toolholder for mounting of machining tools, and an electric drive for rotating the toolholder into a particular working station for the machining tools. The electric drive has a rotor and a stator with coil windings. The rotor of the electric drive is connected to the toolholder. The stator is connected to elements of the housing. The rotary movement for the toolholder is generated without gearing and directly by the electric drive of the rotor enclosing the stator. Since both the rotor and the stator are enclosed by the toolholder and since the rotor is in direct contact with the toolholder on the side of the external circumference and rigidly connected to the toolholder for transmission of torque, the rotor-stator layout creates an external rotor for the electric drive. In that layout, the rotor rotates externally, with the tool holder and the stator being mounted internally of the housing.

21 Claims, 1 Drawing Sheet

TURRET

FIELD OF THE INVENTION

The present invention relates to a turret with a housing to be connected to a machine tool, with a rotatably mounted toolholder to receive machining tools, and with an electric drive to swing the toolholder into a particular operating position for the machining tools. The electric drive has a rotor and a stator with coil windings. The rotor of the electric drive is connected to the toolholder and the stator with elements of the housing. The rotary movement for the toolholder is generated without gearing and is performed directly by the electric drive. The rotor enclosing the stator.

BACKGROUND OF THE INVENTION

DE 199 19 553 C2 discloses a generic, gearless turret having a rotatably mounted toolholder with at least two tools which may be swung or rotated into a particular working position for a tool by an electric pivoting drive. The toolholder is connected non-rotatably to a hollow shaft, and, by way of this hollow shaft, is rotatably mounted in the housing of the toolholder. A so-called ring motor is used as the pivoting drive, so that the electric motor, free of additional converting mechanical power transmission elements, engages the hollow shaft directly and by it generates pivoting movement for the toolholder.

The ring motors used for this purpose in the state of the art are electric motors with an electric winding in the stator, so that torque may be applied to the hollow shaft, which shaft is rigidly connected to the toolholder so as not to rotate. The ring motor employed in the state of the art is in the form of an internal rotor, that is, the stator connected to the housing along with the coil elements encloses the rotor on the side of the external circumference. This rotor is connected to the toolholder as an integral part of the hollow shaft.

The conventional ring motor is in this instance mounted in the area of the free end of the hollow shaft. The toolholder is in contrast rigidly mounted together with its machining tools on the other free end of this shaft. The respective structure occupies much installation space, especially on the housing side, so that a "slim" housing cannot be built with the conventional solution. This conventional arrangement limits the installation potential for the conventional turret, especially if this turret is to be used for machine tools which cannot provide the installation space required precisely because of their size or configuration. Since, in addition, the electric drive for the toolholder with the machining tools is mounted a relatively great distance from this toolholder, the respective power introduced for drive power is not the optimum, due to the hollow shaft acting as a torsion spring.

DE 197 19 173 A1 also discloses a generic turret with switchgear having a conical braking surface and a frontal braking surface on first and second brake disks movable relative to each other. This particular frontal brake surface is spaced from the respective tapering braking surface at a distance such that during braking the tapering braking surface initially acts to center and decelerate the movement of one brake disk to stop and fix the state of rest (switching position) with high positional accuracy by the frontal brake surface. As a result, the conventional switching device for the turrethead is made up of a small number of simple elements which are robust and long-lasting. The switching device of high-torque and low-speed motor may be moved into a precise angular position. In the case of the conventional solution, the ring motor is again positioned on the housing side, as with the conventional solution described earlier, so that the conventional solution cannot be readily applied, especially under cramped installation conditions.

DE 37 01 090 A1 discloses a switchable-angle modular unit for machine tools, also especially for use with turretheads. The modular unit has a stationary element with a component mounted rotatably around it, a drive motor, gearing, a detent device, and a signal device for registering the angular positions of the rotatable element. The signal device includes a plurality of zero-current detection or coding elements introduced into one of the opposite rotatable elements and a decoding or reading device mounted in another element and operating in conjunction with it. This conventional configuration makes it possible to effect position-oriented recognition of the angular position of the rotatable element, without occurrence of false signals triggered by bounces and without the need for additional installation space. On the contrary, contact-free recognition of the indexing position is possible. The components of the switchable-angle component in question are mounted for the sake of space conservation on the tool disk or toolholder, specifically in the transitional area between the toolholder and the stationary housing elements of the turret. Because of the cramped installation space at the installation location in question, only an electric motor small in structure may be employed. Such motor has relatively low power. Transmission of drive torque to the toolholder or the tool disk by gearing also consumes drive output along with installation space. Because of the great number of parts, the conventional solution is costly in production and susceptible to the breakdowns which may occur.

SUMMARY OF THE INVENTION

Objects of the present invention are to provide improved turrets requiring only a small installation space on the machine tool side for fastening the turret in position, achieving higher output for the electric drive, and transmitting a higher drive output to the toolholder so that more or less torsion-proof machining can be accomplished with the tools.

The foregoing objects are obtained by both the rotor and the stator being enclosed by the toolholder, and the rotor resting directly against the toolholder to be rigidly connected to the toolholder for transmission of torque. The rotor-stator assembly forms an external rotor for the electric drive, one in which the rotor rotates externally with the toolholder. The stator is mounted inside the housing. Since the external rotor is integrated entirely into the toolholder itself, where more installation space is available, a drive design can be produced which is substantially stronger than that of the conventional solutions. In conventional solutions, the interior rotor must enclose a hollow shaft of smaller diameter, so that less winding space is available for the drive design. As a result of integration of the external rotor-motor into the toolholder, the drive output is transmitted directly to the toolholder without the use of transmission gearing. Since the drive design transferred to the interior of the toolholder requires no installation space on the housing side itself of the turret, a "slim" turret is produced on its housing side, and requires little installation space on a machine tool. Especially with smaller machine tools or with ones which have little installation space relative to the machining situation it is possible only with the turret design of the present invention to make successful use of electric drive concepts for swinging the tool disk.

In addition, the turret of the present invention has no drivable hollow shaft. Thus, the high number of elements is reduced, lowering production costs and reducing the possibility of wear which results in increased down time for the turret. It has been found to be especially advantageous to design the electric drive as a synchronous motor. Since the speed of such motors depends on the frequency, but is independent of the load applied, speed-stable control is possible for the tool disk or the toolholder, regardless of the number of machine tools mounted on the holder and regardless of their weight or the respective machining situation. Since the turret claimed for the invention manages without transmission gearing, the drive concept as a whole is designed to be relatively rigid to favor machining accuracy. Although the overall drive concept is essentially an integral part of the tool disk, undesirable vibrations, which could have an undesirable effect on machining accuracy, do not occur.

In a preferred embodiment of the turret of the present invention, the outer circumference of the rotor is spaced a radial distance from the longitudinal axis of the turret, which distance is greater than half the respective distance of an outer circumferential section of the toolholder from this longitudinal axis. The stator is in this case mounted in the area of the free end of the columnar housing element, which extends stepwise in the direction of the toolholder up to a diameter which is larger than a base housing element over which the toolholder is mounted on the housing of the turret.

In view of these measures, use of an electric motor built with a large diameter with a large number of rotor and stator windings is possible. In this way, a high degree of power and torque can be achieved for the drive of the toolholder.

In an especially preferred embodiment of the turret of the present invention, a locking device is provided between toolholder and the housing. The locking device is preferably in the form of a brake, in particular a multiple-disk brake, or of a coupling, especially a serrated clutch (Hirth gearing, serration). The locking device makes it possible to fix the toolholder definitively in its machining position after being swung. The forces occurring in machining with the machine tools need not, as is the case with the conventional solution disclosed in DE 199 19 553 C2, be absorbed by the relatively low-power electric drive. Rather, the load is completely removed from the electric drive because of the locking device, and power is introduced into the housing exclusively by way of this locking device.

On the basis of the installation space available on the toolholder, the external rotor motor of the present invention can have substantially larger dimensions than the conventional internal rotor motor. Consequently, higher drive power is also available. Depending on the machining situation, the electric power of the external rotor motor may also be entirely sufficient for reliable absorption of the machining forces without a locking device.

In a preferred embodiment of the turret of the present invention, the locking device is operated hydraulically or pneumatically by way of an operating device. Very high braking or coupling forces can be made available by way of appropriate actuation. Forces of any intensity arising in operation can then be transferred into the housing of the turret without causing failure of this turret.

In another preferred embodiment of the turret of the present invention, the stator may be cooled by a cooling device, especially one involving water cooling. The cooling lines are mounted in a part of the carrier as part of the housing. Because of the corresponding cooling device, the heating that might occur in the stator at markedly higher torque values can be absorbed and transferred to the exterior so that heating of material, something which may occasionally impair zero-backlash and high-precision machining, cannot occur, either in the housing or in the toolholder.

In another preferred embodiment of the turret of the present invention, the holder element has a guide channel in which at least delivery of current for the electric drive takes place. The drive can be provided with current for the electric drive from the interior of the housing to conserve space. The holder element in the housing can also be configured such that shafts actuatable by a separate drive motor could be guided to the toolholder in such a way that actuatable machine tools on the toolholder could be used. A corresponding energy transmission and drive concept is disclosed in DE 40 18 543 C1 and EP 0 302 998 A1. This conventional solution could be transferred to the turret of the present invention.

In another preferred embodiment of the turret of the present invention, the respective position of the pivotable toolholder relative to the fixed housing can be detected by a sensor device, in particular an angular position transmitter. A reading head of the angular position transmitter is mounted preferably on the holder element. This head has as an additional element a measuring wheel which is mounted on the front side of the toolholder and pivotable with it. The corresponding monitoring device is also mounted inside the toolholder or tool disk to conserve space. In addition, the accompanying sensor or monitoring device makes it possible to actuate the electric drive by a suitable control concept in such a way that sure positioning of the machine tools for a forthcoming machining step is made certain.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
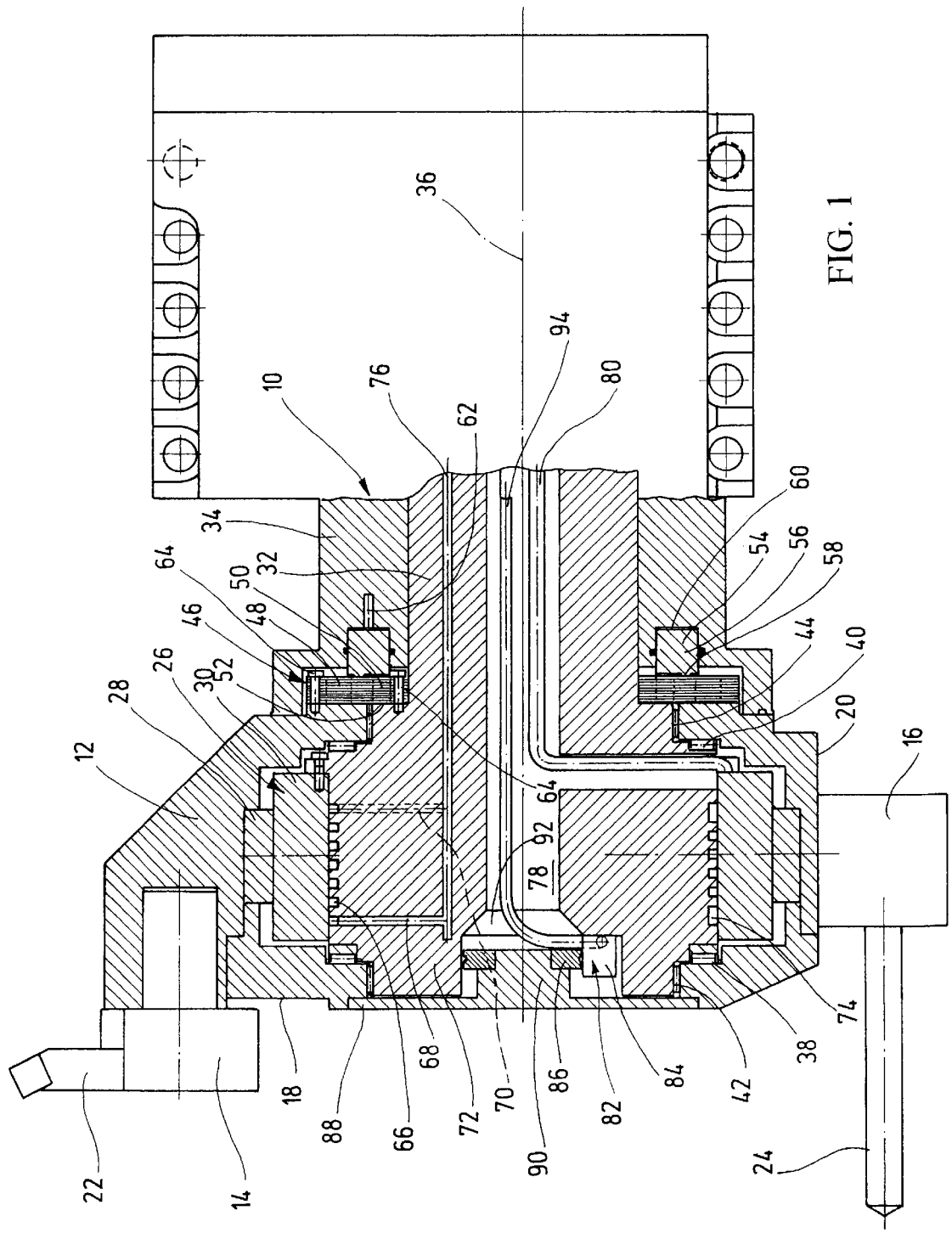
FIG. 1 is a side elevational view, partially in section, of a turret with a toolholder and holder housing according to an embodiment of the present invention.

The turret shown in FIG. 1 has a housing 10 for connection of the turret to a machine tool. In addition, the turret has a toolholder 12 (tool disk) mounted rotatably opposite the housing 10 to accommodate machine tools 14 and 16. The machine tool 14 is mounted axially on the front side 18 of the turret 12. The machining tool 16, in contrast, is mounted on a radial circumference 20 of the toolholder 12. The machine tool 14 carries a kind of turning tool, while the machine tool 16 has a drill bit 24. The turret also has an electric drive designated as a whole as 26. This drive serves the purpose of swinging the toolholder 12 into the respective operating position for the machine tools 14 and 16.

The electric drive 26 has a rotor 28 with magnetic elements (not shown), for example, in the form of permanent magnets. It also has a stator 30 with coil elements (not shown) in form of a plurality of coil windings. The rotor 28 of the electric drive 26 is rigidly connected to the toolholder 12. The stator 30 is similarly connected to the elements 32 of the housing 10. As is also to be seen from FIG. 1, the toolholder 12 is in the form of a disk and encloses the rotor 28. The stator 30 is mounted immediately beneath the rotor. Consequently, the entire electric drive 26 is mounted within the swivel plane and integrated into it in the area of the toolholder 12. This results in a compact layout. Because of the enlarged diameter of the toolholder 12 relative to other housing elements, a large amount of space is available for installation of the electric drive 26, which electric drive may also be designed with enlarged diameter so that a plurality of magnetic elements and coil windings may be provided. In this way, an external rotor motor with a very high performance rating is developed, especially with respect to the torque to be delivered.

The housing 10 has a base housing element 34 into which the housing element 32 is plugged. The diameter of the free end, shown in FIG. 1, of housing element 32 increases incrementally or stepwise. Because of this incremental increase, dependable pivot mounting is achieved for the toolholder 12 to pivot or rotate about the axis 36. Since it is advantageous to intercept the forces arising on the toolholder 12 during machining as near the machining plane as possible and deflect these forces into the housing 10, the relevant bearings for the pivot drive are mounted in a cluster in the area of the enlargement of the housing element 32 in the planes of operation. Thus, the axial bearings are designated as 38 and 40 in the drawing and the associated radial bearings as 42 and 44. All of these bearings are designed as needle bearings and are mounted in pairs as 38, 42 and 40, 44 on the stepped shoulders of the widening columnar housing element 32.

In addition, a locking device, designated as a whole as 46, is present between the toolholder 12 and the housing 10. This locking device 46 is in the form of a multiple-plate brake, with a first stack 48 of plates mounted in succession and rigidly connected to the toolholder 12 by a screw connection. The corresponding plates of a second stack 50 are inserted into the spaces between the plates of the first stack 48. The second stack 50, in turn, is rigidly connected by a screw connection to the front of the section step 52 of the housing element 32. The spaces between the plates of the first stack 48 and the second stack 50 are selected so that when the locking device 46 is not in operation, these plates slide by each other unimpeded as the turret 12 is rotated about is axis 36. If the pivoting process is terminated by the electric drive 26, that is, if, for example, the machine tool 16 has been pivoted to the station of the machine tool 14, the locking device 46 may be operated and the plates of the first and second stacks 48 and 50 are pressed against each other so that the resulting frictional forces exert a braking moment high enough that the machining forces which occur during machining with the respective tool 14 or 16 may be definitely diverted by way of the toolholder 12 into the housing element 32 and thus into the housing 10. The housing 10 in turn is rigidly connected to the base of the machine tool (not shown).

A hydraulic or pneumatic operating device 54 is provided for actuation of the locking device 46 for exertion of braking force. The operating device 54 in question has a ring piston 56 having on its one free end a friction flange 58 by means of which the plate stacks 48, 50 may be pressed together to generate a frictional force. The other free end of the ring piston 56 accordingly ends in an annular space 60 in the cylindrical base housing element 34. When a fluid medium is applied to the annular space 60 through a delivery line 62 (part of which is shown), the usual hydraulic pressure in any event suffices for exertion of an operating force to the ring stacks 48, 50. If, on the other hand, the annular space 60 is kept free of pressure and no medium flows through the delivery line 62 under pressure, the plate stacks 48, 50 are released and the individual plates initially pressed together are returned to their original unlocked position, for example, by the pivoting movement of the toolholder 12. Since the plates are each held in place on their free ends by screws 64, a sort of spring-powered structure is created which ensures or biases return of the plates to their original positions in which the multiple-plate brake is released.

However, a coupling, such as a three-part serration, as disclosed in DE 3 817 893 A1 and EP 0 514 626 A1, could also be used in place of the multiple-plate brake illustrated.

The braking and coupling system ensures that the toolholder 12 is retained in its prescribed position for machining. The positioning does not depend on the potential power output of the motor. In view of the high power with which the electric drive 26 is provided, it is also possible to dispense with the locking device 46 and to absorb the machining forces exclusively by way of the electric drive.

The stator 30 with its coil stacks may be cooled by a cooling device 66. Water cooling or a device with a suitable cooling lubricant can be employed. The coolant lines are mounted in the form of an inlet line 68 and an outlet line 70 in the support element 72 as part 32 of the housing 10. In the sectional expansion of the housing element 32 on the external circumference side, cooling sections 74 are joined together and form a coil which receives the coolant from the inlet line 68. After this coolant has passed through the cooling sections, the coolant flows to the outlet 70 discharging into another outlet line which, as viewed in the line of vision of FIG. 1, extends out of sight behind the inlet line 76 along the axis 36. The inlet line 76 and the outlet line are then connected to a supply unit (not shown) on the machine tool.

The support element 72 and the housing element 32 have a guide channel 78 extending parallel to the longitudinal axis 36 of the turret and through which the current lead-in 80 for the electric drive 26 extends. The current lead-in 80 is connected in particular to the coil windings of the stator 30. In an embodiment of the turret not discussed in detail, the channel guide 78 could also be supplemented by a stationary hollow shaft over which the drive devices could then extend if rotary machining with the machine tools is desired. A power supply column to be used for this purpose is described in DE 40 18 543 C1, and thus not be described further at this point.

The particular position of the swiveling toolholder 12 relative to the stationary housing 10 may be detected by a sensor device designated as a whole as 82, particularly an angular position generator. For this purpose, a reading head 84 of the angular position generator is mounted on support element 72. As an additional element of the sensor, measuring wheel 86 mounted on a front plate 88 of the toolholder 12 and may be swiveled or rotated together with it. For the respective mounting, on its side facing away from the exterior, the front plate 88 has a central shoulder 90 extending coaxially relative the axis 36 and engaging a recess 92 in the support element 72. The ringshaped measuring wheel 86 then extends along the external circumference of the central shoulder 90. The reading head 84 must carry out sensing at only one point. For the data of the angular position generator to be forwarded to a control unit, a measurement or data line 94 is connected to the reading head 84. Line 94 is also carried in the channel guide 78 of the support element 72 or the housing element 32.

By the turret design of the present invention, the electric external rotor drive is mounted immediately in the swiveling or rotational area of the toolholder 12. The electric drive 26 can apply very high torque. Integration of the electric drive 26 into the area of rotation of the toolholder 12, accompanied by mounting of the relevant bearing points 38, 40, 42, and 44 in the direction of the machining plane, makes a zero-play and zero-slippage machining process possible with the respective tools 14 or 16. In addition, the hydraulically actuatable brake in the form of the locking device 46 makes certain that forces arising during machining will be reliably diverted into the housing 10.

While one embodiment has been chosen to illustrate the invention, it will be understood by those skilled in the art that various changes and modifications can be made therein without departing from the scope of the invention as defined in the appended claims.

What is claimed is:

1. A turret, comprising:
   a relatively stationary housing connectable to a machine tool and having housing elements including a fixed columnar housing element and a base housing element, said columnar housing element having a free end with an outside diameter greater than an outside diameter of said base housing element;
   a toolholder mounted for rotation about an axis of rotation on said housing, configured for mounting a plurality of machine tools, and connected to said base housing element;
   an electric drive for rotating said toolholder into a particular operating station for a desired one of the machine tools, said electric drive having a rotor and a stator with coil windings surrounded by said rotor, said toolholder surrounding said stator and said rotor with said rotor being in direct contact on an external circumference thereof with said toolholder and being rigidly connected to said toolholder to transmit torque, said stator having an inner surface in direct contact with said free end of said fixed columnar housing element; and
   friction reducing bearings arranged axially and radially relative to said axis of rotation and between said columnar housing element and said toolholder;
   whereby, rotational movement of said toolholder is performed directly by said electric drive without gearing.

2. A turret according to claim 1 wherein
   said bearings are needle bearings.

3. A turret according to claim 1 wherein
   said external circumference of said rotor is radially spaced from said axis by a distance greater than one-half of a distance of an external surface of said toolholder from said axis.

4. A turret according to claim 1 wherein
   said fixed columnar housing element comprises outside diameters increasing in a stepwise manner toward said free end.

5. A turret according to claim 1 wherein
   a locking device is mounted on a transitional surface between said toolholder and said base housing element.

6. A turret according to claim 5 wherein
   said locking device comprises an external diameter smaller than an external diameter of said stator.

7. A turret according to claim 5 wherein
   said locking device is mounted on a side of said base housing element facing away from a front side of said toolholder.

8. A turret according to claim 5 wherein
   said locking device comprises a brake.

9. A turret according to claim 5 wherein
   said locking device comprises a multiple-plate brake.

10. A turret according to claim 5 wherein
    said locking device comprises a gear coupling.

11. A turret according to claim 5 wherein
    said locking device is operated by a hydraulic operating device.

12. A turret according to claim 5 wherein
    said locking device is operated by a pneumatic operating device.

13. A turret according to claim 1 wherein
    said electric drive is an asynchronous motor.

14. A turret according to claim 1 where
    said electric drive is a synchronous motor.

15. A turret according to claim 1 wherein
    a cooling device is coupled to said stator; and
    coolant lines for said cooling device are mounted in a support element formed as part of said housing.

16. A turret according to claim 15 wherein
    water forms coolant for said cooling device.

17. A turret according to claim 15 wherein
    said support element comprises a guide channel receiving electrical lines connected to said electric drive.

18. A turret according to claim 1 wherein
    a sensor device fixes rotated positions of said toolholder relative to said housing.

19. A turret according to claim 18 wherein
    said sensor device is an angular position generator.

20. A turret according to claim 18 wherein
    a hollow shaft rotation generator is mounted between a support element formed as part of said housing and a front plate of said toolholder.

21. A turret according to claim 1 wherein
    stationary and rotating machine tools are mounted on at least one of a radial circumference and a front side of said toolholder.

* * * * *